(12) United States Patent
Meier et al.

(10) Patent No.: US 11,512,969 B2
(45) Date of Patent: Nov. 29, 2022

(54) METHOD FOR ASCERTAINING IN A BACKEND, AND PROVIDING FOR A VEHICLE, A DATA RECORD, DESCRIBING A LANDMARK, FOR THE VEHICLE TO DETERMINE ITS OWN POSITION

(71) Applicant: Continental Automotive GmbH, Hannover (DE)

(72) Inventors: Herbert Meier, Regensburg (DE); Alexander Ivanov, Kelheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/320,229

(22) PCT Filed: Jun. 9, 2015

(86) PCT No.: PCT/EP2015/062836
§ 371 (c)(1),
(2) Date: Dec. 19, 2016

(87) PCT Pub. No.: WO2016/000919
PCT Pub. Date: Jan. 7, 2016

(65) Prior Publication Data
US 2017/0122763 A1    May 4, 2017

(30) Foreign Application Priority Data

Jul. 2, 2014 (DE) .......................... 102014212781.5

(51) Int. Cl.
*G01C 21/36* (2006.01)
*G01C 21/28* (2006.01)
(Continued)

(52) U.S. Cl.
CPC ......... *G01C 21/3602* (2013.01); *G01C 21/28* (2013.01); *G06T 7/73* (2017.01);
(Continued)

(58) Field of Classification Search
CPC ...... G01C 21/3602; G01C 21/28; G06T 7/73; G06T 2200/16; G06T 2207/30204;
(Continued)

(56) References Cited

U.S. PATENT DOCUMENTS 8,085,984 B2   12/2011   Nakamura et al.
8,284,995 B2   10/2012   Diaz et al.
(Continued)

FOREIGN PATENT DOCUMENTS

CN   101091103 A   12/2007
CN   101517366 A   8/2009
(Continued)

OTHER PUBLICATIONS

International Search Report and Written Opinion dated Nov. 17, 2015 from corresponding International Patent Application No. PCT/EP2015/062836.
(Continued)

*Primary Examiner* — Frederick M Brushaber
*Assistant Examiner* — Elizabeth Yang

(57) ABSTRACT

A vehicle takes and evaluates an image of the surroundings of the vehicle. If the result of the evaluation is that the image possibly contains a static object that could be suitable as a landmark, then the image and a position of the vehicle ascertained by the vehicle at the location at which the image is taken are transmitted to a data processing station. Image analysis of the received image allows the data processing station to establish whether the supposedly static object is suitable as a landmark. When the object has been verified as a landmark, the data processing station creates a data record describing the object, which data record is transmitted to the vehicle.

19 Claims, 2 Drawing Sheets

Figure 1:
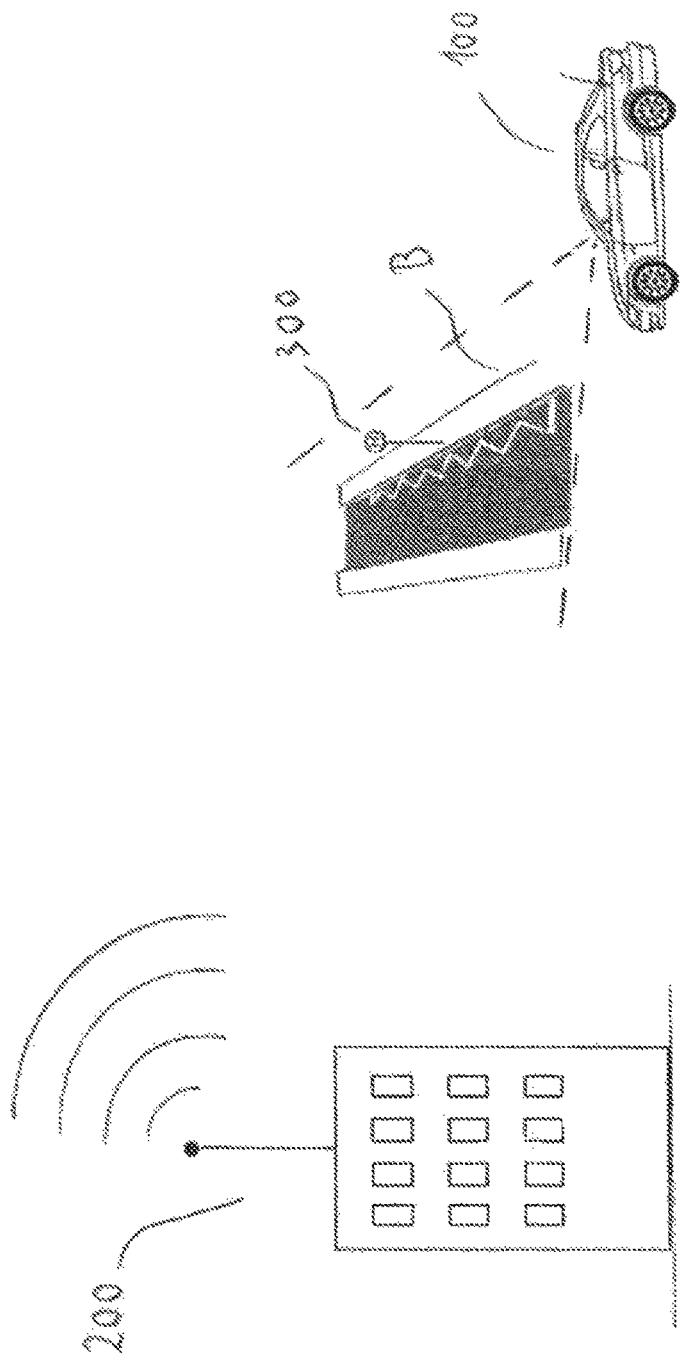

(51) Int. Cl.
    *G08G 1/0967* (2006.01)
    *G06T 7/73* (2017.01)
    *G06V 10/40* (2022.01)
    *G06V 20/56* (2022.01)
    *H04N 5/77* (2006.01)
    *H04N 7/18* (2006.01)

(52) U.S. Cl.
    CPC .............. *G06V 10/40* (2022.01); *G06V 20/56* (2022.01); *G08G 1/09675* (2013.01); *H04N 5/77* (2013.01); *H04N 7/183* (2013.01); *G06T 2200/16* (2013.01); *G06T 2207/30204* (2013.01); *G06T 2207/30244* (2013.01); *G06T 2207/30256* (2013.01); *G08G 1/096725* (2013.01); *G08G 1/096775* (2013.01)

(58) Field of Classification Search
    CPC ........... G06T 2207/30244; G06T 2207/30256; G06K 9/00791; G06K 9/46; G08G 1/09675; G08G 1/096775; H04N 5/77; H04N 7/183
    See application file for complete search history.

(56) References Cited

U.S. PATENT DOCUMENTS

| | | | |
|---|---|---|---|
| 2001/0055063 A1 | 12/2001 | Nagai et al. | |
| 2004/0119875 A1* | 6/2004 | Hayaishi | H04N 1/00071 348/362 |
| 2007/0160291 A1 | 7/2007 | Takahashi | |
| 2008/0273757 A1* | 11/2008 | Nakamura | G01C 21/26 382/104 |
| 2009/0324058 A1* | 12/2009 | Sandage | G06K 9/6293 382/154 |
| 2010/0176987 A1 | 7/2010 | Hoshizaki | |
| 2011/0161032 A1* | 6/2011 | Stahlin | G01C 21/30 702/94 |
| 2012/0121161 A1 | 5/2012 | Eade et al. | |
| 2013/0155222 A1 | 6/2013 | Min et al. | |
| 2013/0242098 A1* | 9/2013 | Hahne | G08G 1/04 348/148 |
| 2015/0092979 A1* | 4/2015 | Meredith | G06F 16/583 382/103 |
| 2015/0186733 A1* | 7/2015 | Hayakawa | G06K 9/00805 382/103 |
| 2016/0231432 A1* | 8/2016 | Simon | G01S 19/49 |
| 2016/0265919 A1* | 9/2016 | Schuller | G01C 21/30 |
| 2016/0275790 A1* | 9/2016 | Kang | G07C 5/0866 |

FOREIGN PATENT DOCUMENTS

| | | |
|---|---|---|
| CN | 102099656 A | 6/2011 |
| CN | 103413124 A | 11/2013 |
| DE | 102008020446 A1 | 3/2009 |
| DE | 102008043756 A1 | 5/2010 |
| DE | 102010030068 A1 | 12/2011 |
| DE | 102012107886 A1 | 2/2014 |
| DE | 102012215533 A1 | 3/2014 |
| WO | 2009/098154 A1 | 8/2009 |

OTHER PUBLICATIONS

David Schleicher et al., "Real-Time Hierarchical Outdoor SLAM Based on Stereovision and GPS Fusion", Intelligent Transportation Systems, IEEE Transactions on, vol. 10, No. 3, pp. 440-452, Sep. 2009.

Lategahn Henning et al., "Urban localization with camera and inertial measurement unit", 2013 IEEE Intelligent Vehicles Symposium (IV), IEEE, Jun. 23, 2013, pp. 719-724, XP032501982, ISSN: 1931-0587, DOI; 10.1109/IVS.2013.6629552, found on Oct. 10, 2013, The whole document.

Qin LV et al., "Image Similarity Search with Compact Data Structures", CIKM '04, Washington, DC, USA, Nov. 8-13, 2004, pp. 208-217.

* cited by examiner

METHOD FOR ASCERTAINING IN A BACKEND, AND PROVIDING FOR A VEHICLE, A DATA RECORD, DESCRIBING A LANDMARK, FOR THE VEHICLE TO DETERMINE ITS OWN POSITION

The invention relates to a method for ascertaining and providing a landmark for position finding for a vehicle.

Many applications require a vehicle's own position to be known in the vehicle with a high level of accuracy. A highly accurate position with reference to usable lanes is needed particularly in vehicles in which highly automated driving is possible in future. Usable lanes in this case may be either marked lanes or paths that have already been used by other vehicles and whose route has been recorded with a high level of accuracy.

Precise ascertainment of a position of the vehicle in the vehicle itself can involve the use of algorithms for differential navigation, for example differential GPS, today. Furthermore, algorithms that are used to evaluate patterns from LIDAR sensors to ascertain a position with a high level of accuracy can be used. The use of both methods is associated with a high level of cost, however, on account of the expensive GPS receivers and LIDAR sensors.

A further option for determining a highly accurate position in the vehicle involves a vehicle identifying landmarks in the surroundings of the vehicle. When a respective position of these landmarks is known and is on hand in the vehicle, the position of the vehicle can be ascertained with a high level of accuracy in the vehicle on the basis of the position of the landmark captured in the surroundings of the vehicle. The use of such a method requires a multiplicity of landmarks to be captured and to be available in the vehicle for evaluation.

The object of the present invention is to specify a method for ascertaining and providing a landmark for position finding for a vehicle that reliably allows the landmark to be ascertained with little complexity and can be used to ascertain the position of the landmark with a high level of accuracy.

An embodiment of a method for ascertaining and providing a landmark for position finding for a vehicle is specified in patent claim 1. To perform the method, a vehicle having an image recording device for recording an image of surroundings of the vehicle, having an image evaluation device for evaluating the image and having a position finding device for ascertaining a position of the vehicle is provided. Furthermore, a data processing station having an image analysis device for analyzing the image to establish a landmark in the image is provided. The image recording device is used by the vehicle to record an image of the surroundings of the vehicle. A position of the vehicle is ascertained at the location of the recorded image by means of the position finding device. The image evaluation device is used to evaluate the image in the vehicle.

The recorded image and the ascertained position of the vehicle are transmitted from the vehicle to the data processing station when the image evaluation device evaluates at least one of the objects that the recorded image contains as a static object. The image analysis device analyses the received image in order to establish whether the at least one object is suitable as a landmark. A position of the at least one object is ascertained in the received image by the image analysis device when it has been established that the at least one object is suitable as a landmark. Furthermore, a data record describing the at least one object is produced by the data processing station when it has been established that the at least one object is suitable as a landmark. The data record produced is transmitted from the data processing station to the vehicle.

The method for ascertaining and providing a landmark for position finding for a vehicle involves optimized cooperation between image capture in a vehicle with subsequent image evaluation and further, more complex and more accurate image analysis in the data processing station (backend), in which there is much more computation power available than in the vehicle. The ever more frequent use of mono or stereo cameras, for example for lane or sign recognition, means that most vehicles already have an image recording device available in them that can be used for recording an image and for later identification of a highly accurate position. On the basis of the method, an image is not recorded and evaluated at every position at which the vehicle is located. Instead, the current vehicle position can be determined from a highly accurately determined position by means of the position finding device by virtue of evaluation of signals from a satellite navigation system and/or by virtue of evaluation of signals from the vehicle sensors for a further stretch of road, with the accuracy of the position finding for the further stretch of road remaining within the required scope in this case.

The method particularly takes into consideration that the available bandwidth for transmitting images from the vehicle to the data processing station is limited and that the data processing station has a higher processing capacity available in it. The image evaluation device of the vehicle can take the objects identified in a recorded image as a basis for rating how high the probability is that significant landmarks are contained in the recorded image. Furthermore, it is already possible to assess in a vehicle how frequently landmarks are needed. This is dependent on the usable stretch of road and on the already available landmarks, for example. This allows the transmission rate for the transmission of data, particularly of images, from the vehicle to the data processing station to be reduced to a low frequency, for example a frequency of less than 1 Hz. As a result, images can be transmitted from a vehicle to the data processing station in real time if LTE (Long Term Evolution Standard) is available, for example.

In the vehicle, the image evaluation of a recorded image merely makes a preliminary estimate of whether the recorded image has static objects in it that could possibly be suitable as landmarks. The actual image analysis in order to establish whether the recorded image actually contains static objects that are suitable as landmarks and the selection of one or more objects that the image contains as landmarks with position finding take place in the data processing station.

An image processing method as described in the publication by Qin Lv, Moses Charikar and Kai Li: "Image Similarity Search With Compact Data Structures", for example, which is available at the web address http://www.cs.princeton.edu/courses/archive/spr05/cos598 W/bib/p208-lv.pdf, for example, can be used in the data processing station to compile landmarks and particularly features of an object that is suitable as a landmark by virtue of suitable analysis of the image received from the vehicle. The features extracted during the image analysis in the data processing station can be enhanced with supplementary data, for example position statements from the vehicle, and transmitted in the form of a data record back to the vehicle again or to a multiplicity of vehicles of a vehicle fleet, where they can be stored in a memory device. The collection of position statements for pertaining to an object that is suitable as a landmark by many vehicles allows the position statement of the object and the description of its features in the data processing station to be improved further.

The data records made available by the data processing station, which indicate landmarks and their features, can be used in the vehicle to ascertain the vehicle position. To this end, the image recording device can record an image of the surroundings of the vehicle. The landmarks stored in the vehicle are then taken as a basis for searching the image for landmarks that ought to be identifiable in the region of the vehicle's own position, for example determined by means of satellite navigation and/or vehicle sensors. The accuracy of the position of the vehicle as determined by means of satellite navigation and/or vehicle sensors can then be improved on the basis of the relatively identified position of the landmark.

Figure 2:
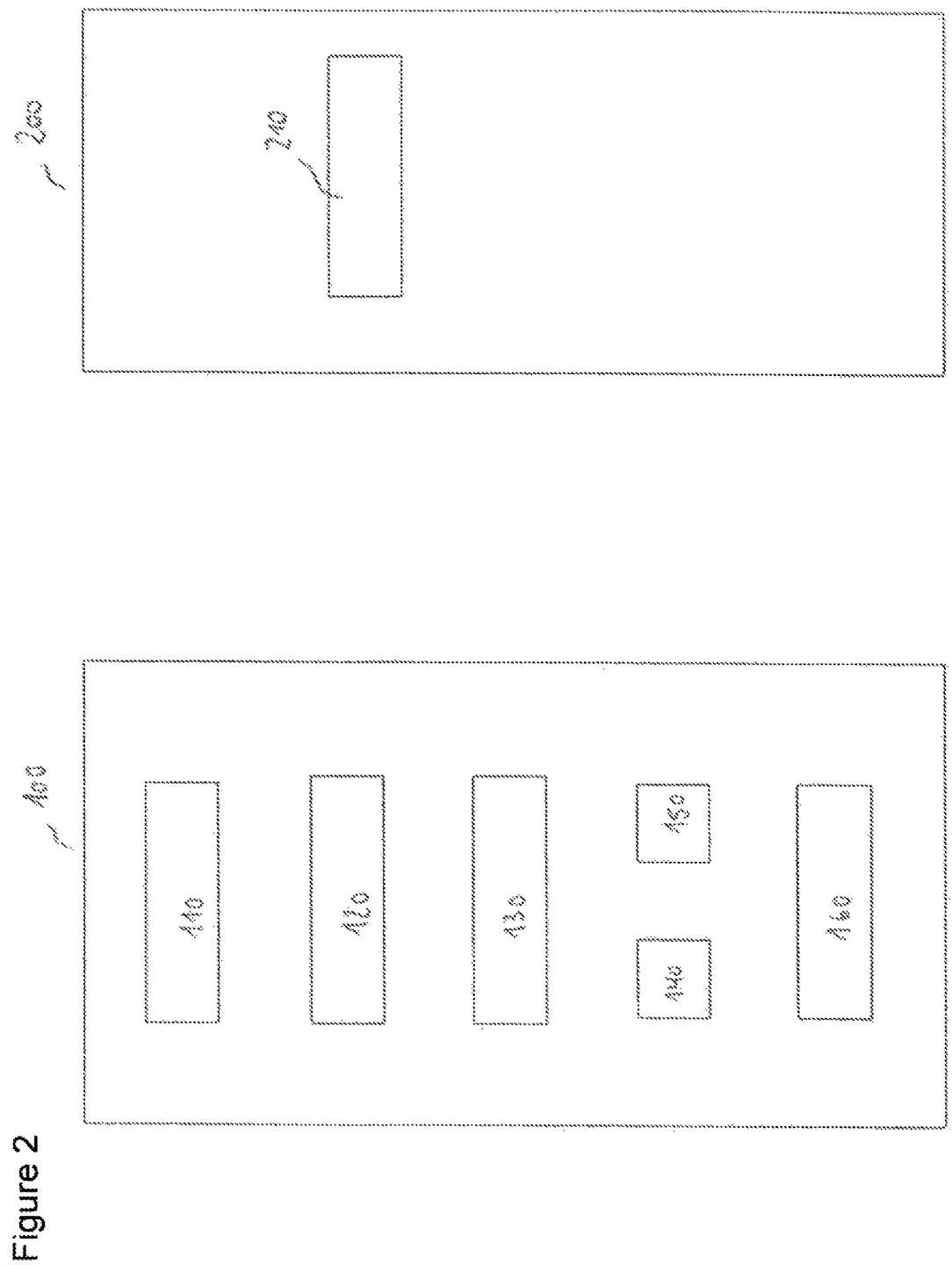

The invention is explained in more detail below with reference to figures that show exemplary embodiments of the present invention and in which:

FIG. 1 shows an arrangement for ascertaining and providing a landmark for a vehicle, FIG. 2 shows an embodiment of a vehicle and of a data processing station for performing a method for ascertaining and providing a landmark for the vehicle.

FIG. 1 shows a vehicle 100 that, for the purpose of highly automated driving, for example, needs to ascertain its own position with a high level of accuracy. To this end, a data processing station (backend) 200 of a service provider provides the vehicle with data records that describe landmarks in the surroundings of the vehicle 100. To compile the landmarks an image recording device of the vehicle records images B, which contain static objects 300, and transmits them to the data processing station 200 for further evaluation.

Image analysis using suitable algorithms allows the data processing station 200 to establish whether an object 300 that the received image B contains is suitable as a landmark. If the data processing station 200 has established that a static object that the image B contains appears suitable as a landmark, then the image analysis can extract the features of the object and ascertain the position of the object.

On the basis of the ascertained position and the extracted features of the object suitable as a landmark, the data processing station 200 generates a data record. The data record is transmitted from the data processing station 200 to the vehicle 100 or to further vehicles of a vehicle fleet. When a vehicle recognizes an object in a recorded image as a landmark, the vehicle can ascertain its position relative to the highly accurately known position of the landmark.

FIG. 2 shows components that are provided in the vehicle 100 and in the data processing station 200 for performing a method for ascertaining and providing a landmark for position finding for the vehicle. The vehicle 100 comprises an image recording device 110 for recording the image B of surroundings of a vehicle, an image evaluation device 120 for evaluating the image B and a position finding device 130 for ascertaining a position of the vehicle 100. The data processing station 200 comprises an image analysis device 210 for analyzing the image B in order to identify an object that the image B contains as a landmark.

In the vehicle 100, the image recording device 110 is first of all used to record an image B of the surroundings of the vehicle. The image evaluation device 120 evaluates the recorded image B for the presence of static objects that could possibly be suitable as landmarks. By way of example, the image recording device 110 may be an ambient camera that can be used to record video sequences of the surroundings of the vehicle 100 that are subsequently analyzed for the presence of static objects by the image evaluation device 120 by means of video analysis.

The position finding device 130 is furthermore used to ascertain a position of the vehicle 100 at the location of the recorded image B. By way of example, the vehicle 100 may have an antenna 140 for receiving signals from a satellite navigation system and/or at least one sensor 150 for recording driving dynamics of the vehicle 100. The position finding device 130 can ascertain the position of the vehicle 100 at the location of the recorded image B on the basis of a signal from the antenna 140 and/or a signal from the at least one sensor 150.

If the result of the image evaluation in the vehicle is that the recorded image B contains at least one object 300 that is possibly static and could be suitable as a landmark, the image B and the position of the vehicle as ascertained by the position finding device 130 are transmitted from the vehicle to the data processing station 200 for further and more accurate image analysis.

The transmitted image B is analyzed in the data processing station 200 by the image analysis device 210 in order to establish whether the supposedly static object that the image B contains is actually a static object that is suitable as a landmark. If the image analysis in the data processing station 200 establishes that the object that the image B contains is suitable as a landmark, then the position of the object 300 in the received image B is ascertained by the data processing station 200. This can be accomplished by the image analysis on the basis of the position at which the image has been recorded, which is ascertained by the vehicle.

Subsequently, a data record describing the object 300 is produced by the data processing station 200 and transmitted to the vehicle 100. The data record particularly contains the position of the object 300 as ascertained by the data processing station. The data record can be stored in the vehicle 100, for example in a memory device 160. The memory device 160 may store a multiplicity of data records that each describe a static object that serves as a landmark. By way of example, the memory device 160 may store a digital map that contains the static objects or landmarks.

In order to establish whether the object 300 that has already been evaluated as a possibly static object during the image evaluation in the vehicle is actually a static object, the image analysis device 210 extracts features of the at least one object in the received image B. On the basis of the extracted features, the image analysis device 210 of the data processing station 200 can establish whether the object 300 is actually a static object. Furthermore, the extracted features of the object can be used in the data processing station to establish whether the static object is suitable as a landmark.

The data record produced by the data processing station 200 can contain the extracted features and the position of the at least one object 300 as ascertained by the data processing station. Hence, the data processing station 200 can distribute current descriptions of landmarks to the vehicle 100 or to a multiplicity of vehicles of a vehicle fleet.

According to a possible embodiment, the evaluation of the recorded image B by means of the image evaluation device 120 allows the position of the object 300 in relation to the position of the vehicle 100, as ascertained at the location of the recording of the image B, to be estimated in the vehicle itself. A possible landmark can therefore be surveyed in the vehicle itself in relation to the position of the vehicle as ascertained by the position finding device 130 during recording of the image. The image B can be used to transmit the estimated position of the object 300 to the data processing station 200. In the data processing station, it is then possible to use the image analysis device 210 to ascertain the position of the object 300 more accurately on the basis of the position of the object as estimated by the image evaluation device 120.

The data processing station 200 can improve the accuracy of a hitherto inaccurately positioned landmark by issuing orders for fresh recording of an image and/or for fresh surveying of an object to the vehicle 100 or further vehicles of a vehicle fleet. To this end, the data processing station 200 can send a request to record an additional image of the surroundings of a vehicle and to transmit the additional image to the data processing station 200 to the vehicle. The vehicle then uses the image recording device 110 to record an additional image of the surroundings and transmits the additional image to the data processing station 200. By virtue of analysis of the additional image by means of the image analysis device 210, the accuracy of the hitherto ascertained position of the object 300 can be improved further in the data processing station 200.

According to a further embodiment, the vehicle 100 can use the position finding device 130 to ascertain a position of the vehicle at the location of the recording of the additional image. Evaluation of the additional image by means of the image evaluation device 120 allows the position of the object 300 in relation to the position of the vehicle 100, as ascertained at the location of the recording of the additional image, to be estimated in the vehicle. The now recently estimated position of the object 300 can be transmitted from the vehicle 100 to the data processing station 200. The image analysis device 210 can be used to further improve the accuracy of the hitherto ascertained position of the at least one object 300 on the basis of the estimated position of the object 300.

To ascertain a position at which the vehicle is located, the data record stored in the memory device 160 can be used, said data record describing the object 300 suitable as a landmark. To this end, the image recording device 110 of a vehicle records an image of the surroundings of the vehicle. On the basis of the data records stored in the memory device 160 and hence on the basis of the landmarks known in the vehicle, the image is evaluated in the vehicle by the image evaluation device 120 in order to establish whether one of the objects identified in the image matches one of the stored landmarks. If the vehicle has established the presence of the object 300 in the image, for example, then the image evaluation device 120 can establish a relative position of the vehicle 100 in relation to the highly accurately known position of the object 300. Subsequently, the position finding device 130 can ascertain a highly accurate position of the vehicle 100 on the basis of the ascertained relative position of the vehicle in relation to the object 300 and on the basis of the signal from the satellite navigation antenna 140 and/or the signal from the sensor 150 for capturing the driving dynamics of the vehicle.

According to a further possible embodiment, the image evaluation device 120 can determine the relative position of the at least one object 300 in relation to the ascertained position of the vehicle 100. The vehicle 100 can then send correction data to the data processing station 200. The correction data may be data that indicates the ascertained relative position of the at least one object 300 in relation to the position of the vehicle 100. Furthermore, the correction data transmitted from the vehicle 100 to the data processing station 200 may be data that indicate the position of the vehicle 100 on the basis of the signal from the satellite navigation antenna 140 and/or the signal from the sensor 150 for capturing the driving dynamics of the vehicle. Furthermore, the correction data can describe inconsistencies between positions of multiple identified landmarks. On the basis of the received correction data, it is possible for the data processing station 200 to improve the accuracy of the position of the object 300 suitable as a landmark.

The invention claimed is:

1. A method for ascertaining and providing a landmark for position finding for a vehicle, comprising:
provision of a vehicle having an image recording device for recording an image of surroundings of the vehicle and an image evaluation device for evaluating the image by performing image analysis and making a preliminary estimate, based on the image analysis of the image, of whether the recorded image includes at least one static object that could possibly be suitable as a landmark, and the vehicle having a position finding device for ascertaining a position of the vehicle;
provision of a data processing station having an image analysis device for analyzing the image more accurately than the image evaluation device of the vehicle to establish whether the recorded image actually contains at least one static object that is suitable as a landmark in the image;
recording of an image of surroundings of the vehicle using the image recording device of the vehicle, wherein the vehicle also uses the image recording device of the vehicle for at least one of lane recognition and sign recognition;
ascertainment of a position of the vehicle at the location of the recorded image by means of the position finding device;
evaluation via image analysis of the recorded image of the surroundings of the vehicle using the image evaluation device of the vehicle;
transmission from the vehicle to the data processing station of the recorded image of the surroundings of the vehicle and the ascertained position of the vehicle when the image evaluation device of the vehicle preliminarily estimates, based on the image analysis performed by the evaluation device of the vehicle, that at least one of the objects that the recorded image of the surroundings of the vehicle contains is a static object;
further and more accurate image analysis of the received image of the surroundings of the vehicle by the image analysis device of the data processing station in order to establish whether the at least one object is actually suitable as a landmark;
ascertainment of a position of the at least one object in the received image of the surroundings of the vehicle by the image analysis device of the data processing station when the at least one object is suitable as a landmark, the ascertainment of the position of the at least one object in the received image by the image analysis device of the data processing station being based on analyzing the recorded image of the surroundings of the vehicle more accurately than the image evaluation device of the vehicle;
production of a data record describing the at least one object by the data processing station when the at least one object is suitable as a landmark, the data record containing the ascertainment of the position of the at least one object in the received image of the surroundings of the vehicle by the image analysis device of the data processing station;

transmission from the data processing station to the vehicle of the data record describing the at least one object contained in the recorded image of the surroundings of the vehicle;

sending of a request from the data processing station to the vehicle to use the image recording device of the vehicle to record an additional image of the surroundings of the vehicle and to transmit the additional image requested by the data processing station and recorded by the recording device of the vehicle to the data processing station;

in response to receiving the request from the data processing station to the vehicle to use the image recording device of the vehicle to record an additional image of the surroundings of the vehicle, recording of the additional image of the surroundings of the vehicle by means of the image recording device of the vehicle;

in response to recording of the additional image of the surroundings of the vehicle by the image recording device of the vehicle, transmission of the additional image requested by the data processing station and recorded by the recording device of the vehicle from the vehicle to the data processing station; and improvement of the accuracy of the ascertained position of the at least one object by virtue of analysis of the additional image requested by the data processing station and recorded by the recording device of the vehicle by means of the image analysis device.

2. The method as claimed in claim 1, comprising:
extraction of features of the at least one object in the received image by means of the image analysis device; and
establishment of whether the at least one object is suitable as a landmark on the basis of the extracted features of the at least one object by the image analysis device.

3. The method as claimed in claim 2, comprising:
production of the data record such that the data record contains the extracted features and the ascertained position of the at least one object.

4. The method as claimed claim 3, comprising:
provision of the vehicle having an antenna for receiving signals from a satellite navigation system and/or having at least one sensor for capturing driving dynamics of the vehicle; and
ascertainment of the position of the vehicle at the location of the recorded image by the position finding device, on the basis of a signal from the antenna and/or a signal from the at least one sensor.

5. The method as claimed claim 4, comprising:
estimation of a position of the at least one object in relation to the position of the vehicle, as ascertained at the location of the recording of the image, by virtue of the evaluation of the recorded image by means of the image evaluation device in the vehicle; and
ascertainment of the position of the at least one object by means of the image analysis device on the basis of the position of the at least one object, as estimated by the image evaluation device.

6. The method as claimed in claim 5, comprising:
sending of a request from the data processing station to the vehicle to record an additional image of the surroundings of the vehicle and to transmit the additional image to the data processing station;
recording of the additional image of the surroundings of the vehicle by means of the image recording device;
transmission of the additional image from the vehicle to the data processing station; and improvement of the accuracy of the ascertained position of the at least one object by virtue of analysis of the additional image by means of the image analysis device.

7. The method as claimed in claim 6, comprising:
ascertainment of a position of the vehicle at the location of the recording of the additional image by means of the position finding device;
estimation of the position of the at least one object in relation to the position of the vehicle, as ascertained at the location of the recording of the additional image, by virtue of evaluation of the additional image by means of the image evaluation device;
transmission of the position of the at least one object, as estimated by virtue of evaluation of the additional image, from the vehicle to the data processing station; and
improvement of the accuracy of the ascertained position of the at least one object by means of the image analysis device on the basis of the position of the at least one object as estimated by virtue of evaluation of the additional image by the image evaluation device.

8. The method as claimed in claim 1, comprising:
provision of the vehicle having an antenna for receiving signals from a satellite navigation system and/or having at least one sensor for capturing driving dynamics of the vehicle; and
ascertainment of the position of the vehicle at the location of the recorded image by the position finding device, on the basis of a signal from the antenna and/or a signal from the at least one sensor.

9. The method as claimed in claim 8, comprising:
storage of the data record in a memory device in the vehicle;
recording of a further image of the surroundings of the vehicle;
evaluation of the further image on the basis of the stored data record by the image evaluation device to establish the presence of the at least one object in the further image;
establishment of a relative position of the vehicle in relation to the position of the at least one object, as indicated in the data record, by the image evaluation device when the presence of the at least one object in the further image has been established; and
ascertainment of a position of the vehicle by the position finding device on the basis of the relative position of the vehicle, as ascertained by the image evaluation device, and the signal from the antenna and/or the signal from the at least one sensor.

10. The method as claimed in claim 9, comprising:
ascertainment of the relative position of the at least one object in relation to the ascertained position of the vehicle by the image evaluation device.

11. The method as claimed in claim 10, comprising:
transmission of first data, which indicate the position of the vehicle on the basis of the signal from the antenna and/or the signal from the at least one sensor, from the vehicle to the data processing station;
transmission of second data, which indicate the ascertained relative position of the at least one object in relation to the position of the vehicle, from the vehicle to the data processing station; and
improvement of the accuracy of the ascertained position of the at least one object by means of the image analysis device on the basis of the received first and second data.

12. The method as claimed in claim 1, comprising:
estimation of a position of the at least one object in relation to the position of the vehicle, as ascertained at the location of the recording of the image, by virtue of the evaluation of the recorded image by means of the image evaluation device in the vehicle; and
ascertainment of the position of the at least one object by means of the image analysis device on the basis of the position of the at least one object, as estimated by the image evaluation device.

13. The method as claimed in claim 12, comprising:
storage of the data record in a memory device in the vehicle;
recording of a further image of the surroundings of the vehicle;
evaluation of the further image on the basis of the stored data record by the image evaluation device to establish the presence of the at least one object in the further image;
establishment of a relative position of the vehicle in relation to the position of the at least one object, as indicated in the data record, by the image evaluation device when the presence of the at least one object in the further image has been established; and
ascertainment of a position of the vehicle by the position finding device on the basis of the relative position of the vehicle, as ascertained by the image evaluation device, and the signal from the antenna and/or the signal from the at least one sensor.

14. The method as claimed in claim 1, comprising:
ascertainment of a position of the vehicle at the location of the recording of the additional image by means of the position finding device;
estimation of the position of the at least one object in relation to the position of the vehicle, as ascertained at the location of the recording of the additional image, by virtue of evaluation of the additional image by means of the image evaluation device;
transmission of the position of the at least one object, as estimated by virtue of evaluation of the additional image, from the vehicle to the data processing station; and
improvement of the accuracy of the ascertained position of the at least one object by means of the image analysis device on the basis of the position of the at least one object as estimated by virtue of evaluation of the additional image by the image evaluation device.

15. The method as claimed in claim 14, comprising:
storage of the data record in a memory device in the vehicle;
recording of a further image of the surroundings of the vehicle;
evaluation of the further image on the basis of the stored data record by the image evaluation device to establish the presence of the at least one object in the further image;
establishment of a relative position of the vehicle in relation to the position of the at least one object, as indicated in the data record, by the image evaluation device when the presence of the at least one object in the further image has been established; and
ascertainment of a position of the vehicle by the position finding device on the basis of the relative position of the vehicle, as ascertained by the image evaluation device, and the signal from the antenna and/or the signal from the at least one sensor.

16. The method as claimed in claim 15, comprising:
ascertainment of the relative position of the at least one object in relation to the ascertained position of the vehicle by the image evaluation device.

17. The method as claimed in claim 16, comprising:
transmission of first data, which indicate the position of the vehicle on the basis of the signal from the antenna and/or the signal from the at least one sensor, from the vehicle to the data processing station;
transmission of second data, which indicate the ascertained relative position of the at least one object in relation to the position of the vehicle, from the vehicle to the data processing station; and
improvement of the accuracy of the ascertained position of the at least one object by means of the image analysis device on the basis of the received first and second data.

18. The method as claimed in claim 1, comprising:
storage of the data record in a memory device in the vehicle;
recording of a further image of the surroundings of the vehicle;
evaluation of the further image on the basis of the stored data record by the image evaluation device to establish the presence of the at least one object in the further image;
establishment of a relative position of the vehicle in relation to the position of the at least one object, as indicated in the data record, by the image evaluation device when the presence of the at least one object in the further image has been established; and
ascertainment of a position of the vehicle by the position finding device on the basis of the relative position of the vehicle, as ascertained by the image evaluation device, and the signal from the antenna and/or the signal from the at least one sensor.

19. The method as claimed in claim 1, wherein the image evaluation device for evaluating the image by performing image analysis and making a preliminary estimate, based on the image analysis of the image, of whether the recorded image includes at least one static object that could possibly be suitable as a landmark allows the transmission rate for the transmission of images from the vehicle to the data processing station to be reduced to a frequency of less than 1 Hz.

* * * * *